US008217785B2

(12) United States Patent  
Steer

(10) Patent No.: US 8,217,785 B2
(45) Date of Patent: Jul. 10, 2012

(54) MOBILE TAG TRACKING SYSTEM

(75) Inventor: David Steer, Nepean (CA)

(73) Assignee: Research in Motion Limited, Waterloo, Ontario (CA)

( * ) Notice: Subject to any disclaimer, the term of this patent is extended or adjusted under 35 U.S.C. 154(b) by 901 days.

(21) Appl. No.: 12/259,586

(22) Filed: Oct. 28, 2008

(65) Prior Publication Data

US 2010/0102964 A1  Apr. 29, 2010

(51) Int. Cl.
*H04Q 5/22* (2006.01)
*G08C 19/16* (2006.01)
*G08B 1/08* (2006.01)
*G08B 13/14* (2006.01)

(52) U.S. Cl. ............... 340/539.13; 340/572.1; 340/10.1; 340/10.3; 340/12.51; 235/375; 235/384; 235/385

(58) Field of Classification Search .......................... None
See application file for complete search history.

(56) References Cited

U.S. PATENT DOCUMENTS

| 6,177,861 | B1 | 1/2001 | MacLellan et al. |
| 6,275,476 | B1 * | 8/2001 | Wood, Jr. ........................ 370/312 |
| 6,720,876 | B1 * | 4/2004 | Burgess ....................... 340/568.1 |
| 7,323,991 | B1 | 1/2008 | Eckert et al. |
| 7,362,212 | B2 * | 4/2008 | Burghard et al. ............. 340/10.2 |
| 7,936,706 | B2 * | 5/2011 | Wood, Jr. ........................ 370/312 |
| 2002/0089434 | A1 | 7/2002 | Ghazarian |
| 2004/0061646 | A1 | 4/2004 | Andrews et al. |
| 2004/0099738 | A1 * | 5/2004 | Waters ........................... 235/451 |
| 2005/0114326 | A1 | 5/2005 | Smith et al. |
| 2007/0001854 | A1 * | 1/2007 | Chung et al. .................. 340/572.1 |
| 2007/0100921 | A1 * | 5/2007 | Barnett et al. .................. 708/250 |
| 2007/0241864 | A1 * | 10/2007 | Nagai ............................. 340/10.1 |
| 2008/0315999 | A1 * | 12/2008 | Braiman ........................ 340/10.4 |
| 2010/0141430 | A1 * | 6/2010 | Steer .......................... 340/539.13 |
| 2011/0201274 | A1 * | 8/2011 | Freathy et al. ................ 455/41.2 |

FOREIGN PATENT DOCUMENTS

| CA | 2565817 | 6/2006 |
| KR | 100765952 | 10/2007 |
| WO | 9816849 | 4/1998 |
| WO | 2004032026 | 4/2004 |
| WO | 2006087716 | 8/2006 |

* cited by examiner

*Primary Examiner* — Julie Lieu
(74) *Attorney, Agent, or Firm* — Fish & Richardson P.C.

(57) ABSTRACT

A mobile tag tracking system for providing mobile security monitoring is provided. The system includes a communications facility, a communications network coupled to the communications facility, and a mobile tag. The mobile tag is coupled to an item to be monitored. The mobile tag has a processor having a memory and for controlling operation of the mobile tag, a radio communications component coupled to the processor for communicating with the communications facility over the communications network for reporting status messages related to the item, a power supply coupled to the processor for providing power to the mobile tag, security sequence generator coupled to the processor for generating binary sequences, a location tracking component coupled to the processor for determining the location of the mobile tag and providing a location signal to the processor, and a clock coupled to the processor. The mobile tag communicates with the communications facility using randomly scheduled communications each including a status message.

15 Claims, 4 Drawing Sheets

MOBILE TAG TRACKING SYSTEM

TECHNICAL FIELD

The present disclosure relates generally to radio frequency communications, and more particularly to a mobile tag tracking system.

BACKGROUND

Conventional methods of monitoring tags on moving objects, such as shipping containers, utilize frequent transmissions reporting an "all's well" message to a security monitoring centre. With this arrangement, an alarm condition may be detected by the security centre either through reception of an alarm message from the tag, or a failure to receive the "all's well" message. The protection provided by this conventional method may be easily circumvented by thieves blocking the radio transmission of an alarm message such as by moving the object and its tag into a tunnel or inside a building. The security centre may further be lulled into a false sense that all is well by thieves re-broadcasting previously recorded "all's well" transmissions. Even without a rebroadcast of the "all's well" signals, the thieves have at least the interval between regular transmission reports to work without detection.

To protect against these kinds of attack, another conventional method requires the tag to report its status continuously, or very frequently. This approach wastes the radio spectrum resources and may therefore limit the number of tags that can be monitored with a limited amount of radio spectrum or communications channel capacity, and also rapidly exhausts the battery in the tag due to the frequent radio transmission. Under normal circumstances, most of the transmissions contain the "all's well" condition and most of the communications traffic is therefore redundant and unnecessary. The frequent transmission also makes the system more sensitive to the normal blockages of transmission that occur in the course of a tagged object's journey. It is difficult to set a tolerance to distinguish natural (i.e., normally occurring) message disruptions and a security alarm event that appears as a message disruption. If the tolerance is set too short, many normal blockages will trigger false-alarms, and if the tolerance is set too long, a deliberate blockage may be assumed to be a natural occurrence and may be dismissed or at least delay detection.

Improvements to conventional mobile tag monitoring systems are therefore desirable.

SUMMARY

One aspect of the present application aims to enable monitoring of tagged objects without the need for continuous or frequent communications between the tag and the security monitoring centre, thus avoiding the consequent occupancy of the radio spectrum and associated communications channels and the rapid discharge of batteries in the mobile tag. Further, the present disclosure aims to protect against deliberate blockage of the radio signals broadcast by the tags or playback of previous broadcasts that may be attempted to mask efforts to tamper with the object protected by the tag. In this regard, a method and apparatus is provided for communications with a tag to protect an object from damage or pilfering without the need for continuous or frequent radio communications with the tag.

A method and apparatus is further provided for communications with a tag to protect an object from damage or pilfering even if the radio signal is deliberately blocked to mask the tampering activity. Further, playback of pre-recorded or false signals to mask tampering activity is further prevented. A method and apparatus is also provided for communications with a tagged object that is not affected by normal or natural interruptions in the communications link that may occur during the course of transportation of the protected object. In one aspect of the present disclosure, the number of mobile tags that may be supported with the radio system is increased by reducing the occupancy of the spectrum used for the radio communications.

One aspect of the present application provides a mobile tag tracking system for providing mobile security monitoring. The system includes a communications facility; a communications network coupled to the communications facility; and a mobile tag coupled to an item to be monitored. The mobile tag has a processor having a memory and for controlling operation of the mobile tag; a radio communications component coupled to the processor for communicating with the communications facility over the communications network for reporting status messages related to the item; a power supply coupled to the processor for providing power to the mobile tag; a security sequence generator coupled to the processor for generating binary sequences; a location tracking component coupled to the processor for determining the location of the mobile tag and providing a location signal to the processor; and a clock coupled to the processor. The mobile tag communicates with the communications facility using randomly scheduled communications each including a status message.

Another aspect of the present application provides a method for providing a mobile security monitoring system using a communications network to connect a mobile tag coupled to an item with a communications facility. The method includes monitoring conditions of the mobile tag and the item by the mobile tag; and sending randomly scheduled communications including status messages to the communications facility from the mobile tag. The status messages include a unique identifier for each randomly scheduled communication.

Yet another aspect of the present application provides an apparatus for monitoring and reporting at least the location of an item attached to the apparatus. The apparatus includes a processor having a memory and for controlling operation of the apparatus; a radio communications component coupled to the processor for communicating with a communications facility for reporting the location of the apparatus and the item; a power supply coupled to the processor for providing power to the apparatus; a security sequence generator coupled to the processor for generating binary sequences; a location tracking component coupled to the processor for determining the location of the apparatus and providing a location signal to the processor; and a clock coupled to the processor.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

A method and apparatus is provided for using the communications capabilities of a network together with radio-equipped tags on mobile objects, such as vehicles or shipping containers, to facilitate automatic notification of loss, damage, or pilfering. The method and apparatus obviate the need for continuous or frequent communications with the tags. Conventionally, the tag monitoring used continuous or nearly continuous transmission to report on the protected object in order to minimize the opportunity for pilfering or damage during the interval between transmissions. Truly continuous communications is generally not possible as the objects are sometimes naturally out of communications range (e.g., inside a tunnel or building) and such continuous or frequent transmissions also occupy too much precious radio spectrum and rapidly exhaust the battery life of the tag. The method and apparatus establish a random or pseudo-random, time-sequenced, and authenticated transmission schedule for the communications between the tag and the security monitoring centre. This time-sequence obviates the need for continuous communications with the tag, reduces the occupancy of the radio spectrum and extends the tag's battery life. In addition, the time sequence protects against deliberate blockage of the radio signal intended to mask tampering with the tagged object or playback of previous communications to make it appear that the tag is still transmitting.

Figure 1:
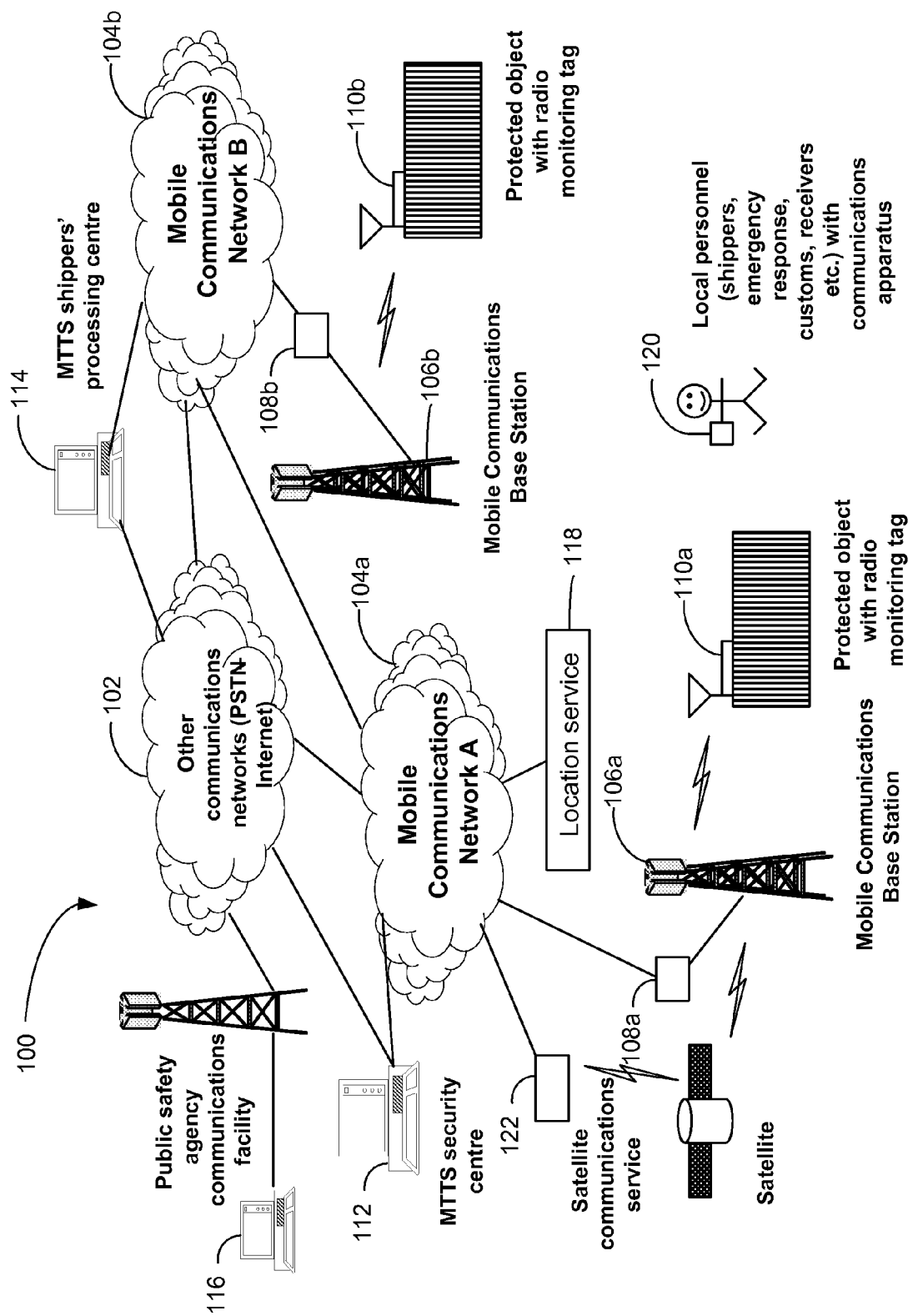
FIG. 1 shows in block diagram form a mobile tag tracking system in accordance with one embodiment.

Referring to FIG. 1, a block diagram is shown illustrating a mobile tag tracking system (MTTS) 100 in accordance with one embodiment. Specifically, FIG. 1 illustrates a communications system of the MTTS 100. The MTTS 100 may include fixed communications networks such as the communications network 102, which in one example may be a public switch telephone network (PSTN) or the internet. The MTTS 100 may also include mobile communications networks 104a and 104b, with associated mobile radio base-stations 106a and 106b and their associated controllers 108a and 108b, which may collectively provide mobile communications coverage over the path of a tag and its associated protected object. The tags and associated objects are indicated with reference 110, indicated individually as 110a and 110b. The mobile communications coverage may include one or more systems such as GSM, CDMA, LTE, public safety agency systems (PSA), private mobile radio networks (PMR), and/or satellite systems indicated by reference 122. These systems are arranged to enable communications with the tags 110 and its associated protected objects and a MTTS security centre 112. There may be other associated centres, such as a shipper's processing facility 114 and the public safety communications and control centres 116. These facilities 114 and 116 may be separate facilities or may be combined into common facilities and may make use of public or private communications networks and facilities. A location service 118 may also be provided to assist the tags 110, the security centre 112, and the processing centre 114 in determining the locations of the tags 110. Although the tags 110 may include, for example, GPS receivers for providing location information, this may be supplemented with additional information, such as mapping and traffic flow information, provided by the location service 118. Various personnel such as customs agents, shippers, receivers, and emergency response teams may also communicate with the tags 110 and its associated objects using a wireless communications apparatus 120. The communications between the apparatus 120 and the tags 110 may be either direct communications between the apparatus 120 and the tags 110 or routed via the supporting networks and the mobile communications channels.

Figure 2:
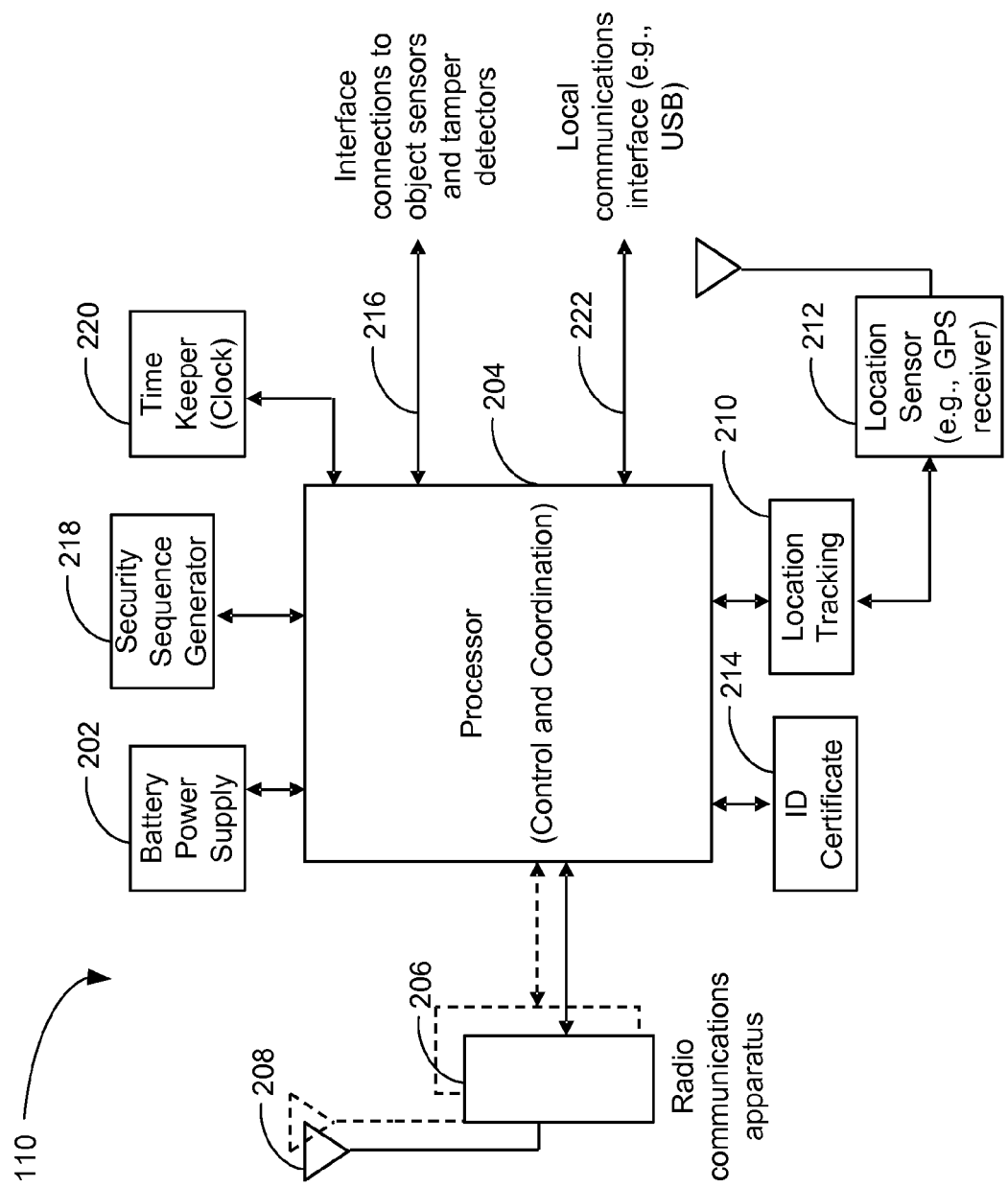
FIG. 2 shows in block diagram form a tag for use with the mobile tag tracking system of FIG. 1 in accordance with one embodiment.

Referring to FIG. 2, a block diagram is shown illustrating a tag 110 for use with the mobile tag tracking system 100 of FIG. 1 in accordance with one embodiment. FIG. 2 further illustrates the functions contained in the tag 110 and the interrelationships among these functions. The tag 110 typically includes a battery power supply unit 202 that powers the tag 110. The tag 110 is equipped with a means to recharge or replace the battery 202 and a means to monitor the condition of the battery 202, which is controlled or coordinated by a processor 204. The tag 110 further includes radio communications apparatus 206 and the associated antennas 208. The tag 110 may have more than one radio communications capability (e.g., GSM, LTE, VHF radio, PMR/PSA, WiFi, "BlueTooth", and/or Satellite communications). These facilities are used under the direction of the control or coordination of the processor 204 for communications via the communications networks 102 and 104 (FIG. 1) to the security centre 112 and the shipper's processing centre 114. In one example, standard communications network protocols may be used or yet to be developed protocols may also be used. The tag 110 may communicate directly with the communications network infrastructure (e.g., via GSM, VHF or satellite radios) or via a multi-hopped link that may utilize the resources of other tags 110 that may be nearby but have better communications paths to the security centre 112 (e.g., using "ad-hoc" or "mesh" or "multi-hop" connectivity such as, for example, the IEEE 802.16j or the IEEE 802.11s standards). Facilities are also provided for location measurement and tracking, indicated by reference 210, that may include, for example a GPS receiver 212 and associated processing capability. The location tracking component 210 provides a location signal to the processor having information allowing the processor to determine the location of the tag 110. An authentication or security capability may be provided by an ID certificate and authentication component 214 that implements a process so that the tag 110 may be authenticated to the security server 112 and the server 112 may be authenticated to the tag 110. The tag 110 may also be able to authenticate and be authenticated by local devices such as might be used by public safety response personnel or customs inspection agents. The identification and authentication process may make use of additional processing capabilities in the control processor 204. The tag 110 further includes an interface means 216 for connection to external sensors to detect tampering with the protected object. The tag may further include a security sequence generator 218, such as a pseudo random binary sequence (PRBS) generator, that is compatible with the security centre 112 and may be synchronized with the security centre 112. Time and security sequence synchronization may be established and maintained between the tag 110 and the MTTS security centre 112 using a time keeping apparatus 220, such as a clock. These various means and functionalities described above may be implemented as either processes executed by the control processor 204 of the tag 110 and stored in an associated memory (not shown), or as discrete components connected to the processor 204.

The communications of the tag 110 may be organized to report at: (a) predefined intervals; (b) upon detecting a change in location; (c) in response to queries from the security centre 112 or the processing centre 114; or (d) to report in the event of an alarm condition being detected by the tag 110, such as tampering, an upset, the tag being off-course, etc. The tag 110 may be enabled to monitor the health of the tag 110 and report faults such as low battery conditions or blocked radio links. The tag 110 and the associated protected object may also contain local wired interfaces, indicated by reference 222 (e.g., a Universal Serial Bus (USB) connection) for local communication, software updating or loading of information using locally attached devices.

The protected object, typically a vehicle or shipping container, which interfaces with the tag 110 using the interface connections 216 may contain sensors to detect tampering. Tampering may be detected based on any number of measured variables such as a door opening, a pressure reduction, gas detection such as $CO_2$, temperature increases or decreases, excessive g-forces or acceleration measurements, or unusual or unexpected location data provided by, for example, the GPS receiver 212. The protected object may also include actuators that may be activated automatically or by the associated tag 110 such as door locks, fire suppressants, floatation devices, audio alarms or olfactory deterrents. These actuators may be connected to the communications tag 110 through the interface connections 216. These actuators may be activated under the control of the processor 204, for example at the request of processes at the MTTS security centre 112 or the shipper's control processing centre 114.

While the tag 110 and the protected object are typically separate items, the tag 110 and the protected object may be combined into a single entity. While the tag 110 may be thought of as a communications and monitoring device attached to a vehicle, shipping container or vehicle in which goods are transported, the tag 110 itself in the form of its memory or packaging may also be the conveyor of information (e.g., a tag 110 integrated with a USB memory key) or physical container including the tag 110 for small items of value needing secure transport.

The MTTS security monitoring centre 112 may be implemented as a server (e.g., a computer with a processor, memory, communications I/O, operating system, and security application software as known by those skilled in the art) attached to a communications network or otherwise attached to a network such that the server may send and receive communications with the mobile tag 110. The security monitoring centre 112 may communicate with and supervise multiple tags 110. The centre 112 includes methods of timekeeping that may be synchronized with the tag clocks 220, means to authenticate the tag 110 and to be authenticated by the tag 110, and to authenticate the messages or transmissions sent by the tags 110. A means is also provided for the security sequence generator that is compatible with the tag's generator 218 and can be synchronized with the tag's generator 218. The security monitoring centre 112 also includes processing capability, communications capability and memory for maintaining the status of tags 110, communicating with the tags 110, and detecting breeches to the security of the tags 110 and the associated objects. The security monitoring center 112 may also communicate with other entities such as the shippers' processing centre 114.

The MTTS shippers' processing centre 114 may be used by the shippers, or others such as the consignees, carriers, insurance carriers, vehicle owners or transportation regulators and safety agencies, to monitor the status of the container and vehicle during its journeys. The centres 114 may also set the state (e.g., loading, empty, travelling, unloading, etc.) of a container and its tag 110 while in use.

The security centre 112 and any associated shippers' processing centre 114 may be implemented as servers (e.g., computers with associated memory, communications apparatus and service processing algorithms) connected to the communications network.

In one embodiment, the MTTS 110 system has two aspects to its operation, being: (a) initial set-up or management; and (b) operation.

A. Initial Set-Up/Management (Loading "Set-Up" State)

As part of its operation, the tag 110 and the security centre 112 may be synchronized and initialized in a set-up mode for the tag 110 and the associated process at the security centre 112. The tag 110 and the container may belong to different organizations and may utilize different security centres 112 and methods of operation for different journeys. The coordination of the tag 110 and its associated security centre 112 and shipping processing centre 114 may be initiated locally by an agent communicating directly with the tag 110, or informing the security centre 112 of the tag 110 and associated container identification and status as ready for initialization.

Before the tag 110 begins its journey (e.g., while the tag 110 is at the shipper's loading dock), the tag 110 and security centre 112 authenticate each other. This authentication may include verification of the security centre 112 by the tag 110 and verification of the tag 110 by the security centre 112. Such mutual authentication is generally supported in the protocols of the wide area mobile communications systems such as GSM.

After establishing the credentials of each other, the tag 110 and the centre 112 may establish a schedule of communications rendezvous and a protocol for the reporting of tag status for the projected journey. The communications establishing this schedule may be protected against eavesdropping by adversaries (e.g., by making use of the communications security facilities of the communications systems such as GSM). This schedule may take into account the knowledge of the journey time, the nature of the manifest and the planned route.

With the schedule established, the tag 110 and the security centre 112 may synchronize clocks for timing and note the starting time and location of the tag and its associated protected object. This information may be saved at one or both of the tag 110 and/or the security center 112.

To protect the communications and the tag 110 and its object, the security centre 112 and/or the tag 110 may select a pseudo random sequence that will be used for scheduling of communications during the journey. For example, the security centre 112 and/or the tag 110 may choose to use a pseudo random binary number generator, such as the security sequence generator 218, to provide a sequence of random times at which the tag 110 sends the status messages to the security centre 112. Equivalently, or in addition, a sequence of random times may also be established for the security centre 112 to query the status of the tag 110 and its associated object. The communications monitoring may thus be bidirectional involving either the tag 110 or the security centre 112 initiating the communications, or both the tag 110 and the security centre 112 initiating the communications at different times.

The tag 110 and the security centre 112 may also agree on an identifier for each of the status messages. In one example, the identifiers may be a sequence of numbers that is incremented for each status message sent. In another example, the identifiers may be a set of random numbers jointly developed and known to both the security centre 112 and the tag 110 but not known outside the tag 110 and the centre 112. The timing sequence and the identification numbers may be uniquely generated for each journey, to prevent the possibility of an attacker knowing the sequence (e.g., if it was a simple counter), which makes it easier for an attacker to counterfeit a status message to impersonate the tag 110. The details of this schedule may be different depending on the value of shipments and perceived threats.

At the receipt of a command from the shipper's processing centre 114, security centre 112 or a local transport carrier, the tag 110 may be switched into a "travelling" mode. When the tag 110 enters this travel mode, the tag 110 sends a "travelling start" message indication to the security centre 112 and receives an acknowledgement from the centre 112. The message used to set the tag 110 into the travelling mode, as well as all other commands directed at the tag 110 such as to end the travelling mode, may be authenticated by the tag 110 using an authentication protocol agreed with the security centre 110. This start of travelling mode may be likened to setting the alarm in a security system. In one example, once the tag 110 enters the travelling mode, the tag 110 sends status messages (e.g., "all's well") to the security centre 112 at the random scheduled times and containing the agreed sequence/authenticity numbers and time information.

The pseudo random timing sequences and identification numbers may be established using cryptographic techniques or other suitable methods. For example, the tag 110 and the security centre 112 may perform a "Diffie-Helman" key exchange to establish a common secret number. Alternatively, if the communication channel is encrypted, then the tag 110 and the security centre 112 may, for example, agree on a common secret number based on concatenation of a random number generated by each of the tag 110 and the security centre 112. This secret number could then be used as the seed for a pseudo random sequence generator (e.g., the PRBS 218) used by the tag 110 and the security centre 112 to calculate a random schedule of times for communication. In one example, to further protect the communications, the tag 110 and the security centre 112 may have a set of more than one possible PRBS generators. One of multiple PRBS generators may be randomly chosen for each journey plan. In another alternative, the agreed common secret numbers may be used as an initialization vector and key for a crypto system (e.g., DES "Digital Encryption Standard" or the AES "Advanced Encryption Standard") that generates the equivalent of a PRBS based on encryption of a mutually agreed text.

The security sequence generator 218, using these or other equivalent methods, may be separated into groups of some number of bits, with those bits used to schedule the number of seconds between tag status message transmissions. A maximum time interval between the random communications transmissions may be set by selecting the number of bits in the group. Thus the level of security, in the form of the maximum time between communications, for the tag 110 and container may be allocated. When high-value or high-threat objects are travelling with the tag 110, few bits may few used (e.g., five bits which may set the maximum possible time between status messages at 31 seconds). A less valuable or less threatened container and tag 110 could use more bits in the group (e.g., ten bits which may provide a maximum possible tag status message interval of about 1023 seconds). Alternatively, the relation between random number and time between transmissions may be something other than one per second (e.g., one quarter second per number).

A new sequence may be used for each tag 110 journey so that adversaries cannot simply record the previous trip's signalling and communications times and replay these to mask tampering at a later date for another journey.

B. Operation (Travel Mode)

During travel mode operation, the tag 110 monitors the status of its protected object (e.g., the container), checks for alarm conditions, and communicates with the security centre 112.

If no alarm conditions are detected by the tag 110, the tag 110 will communicate the status message including an "all's well" messages to the security centre 112 according to the predefined schedule and containing the agreed authentication numbers. The scheduled reports may also contain information about the current conditions of the tag 110 and its associated object and the location of the tag 110. The tag 110 may also report changes in its location or condition (e.g., stopped or moving) according to its predetermined policy. These messages may be combined with the scheduled reports, or sent as needed. Typically, extra messages may not utilize the message sequence numbers predefined for the scheduled messages. The unscheduled messages may be authenticated by the security centre 112 by including in the messages the sequence number of the last scheduled message together with the time until the next scheduled message. The security centre 112 may log these reports in its travel log for the tag 110, and respond with an acknowledgement for those messages that have previously agreed to be acknowledged.

The security centre 112 may monitor for missing status messages or messages that are out of sequence. Missing messages may result in the security centre 112 sending query messages directed to the tag 110. These query messages may confirm a blockage in the communications network, and cause the centre 112 to re-establish a new routing for messages to and from the tag 110. A failure to receive a tag scheduled message together with no response to a query while the tag is known to be in an area of good communications may result in the security centre 112 initiating an alarm condition for the tag 110 and its associated object. This may involve communications to public safety agencies, police or other responders who would be directed to the location of the tag 110. The alarm condition may also be initiated if the reported location of the tag 110 deviates significantly from the planned routing. When the security centre 112 initiates an alarm for the tag 110, the security centre 112 may send a message to the tag 110 indicating that the tag 110 is to enter the alarm status and report its current conditions. Depending on the capabilities of the tag 110 and its actuators, the alarm condition may activate responsive devices or safety devices in the associated object.

During normal travel mode operation, such as when there are no alarm conditions, the tag 110 sends status messages to the security centre 112 according to the time schedule previously arranged. These messages contain the previously agreed contents including the individual sequence number. This enables the security centre 112 to check the validity of each message and detect missing messages. The messages may be acknowledged between the security centre 112 and the tag 110. To reduce the communications traffic and resulting battery consumption of the tag 110, some of the status messages may be acknowledged and some may not be acknowledged, according to a random sequence previously agreed. This makes it difficult for an attacker to impersonate messages as each is unique and contains the random sequence number of the last previously acknowledged message and some messages may require acknowledgment and some may not.

One advantage of using the random scheduling of the security messages is that thieves do not know how long of a time interval they have to block the signal before it will be noticed. As the message schedule may have intervals ranging from a few seconds or less to many minutes or hours, any deliberate blockage of the signals may be quickly detected. The inclusion of the random individual sequence number in each message prevents the thieves from sending previously recorded transmissions to cover intervals of actual transmission blockage. The use of the sequence number and the timing until the next scheduled message in unscheduled messages also blocks the thieves from sending false messages to the security centre 112 as the thieves do not know the random transmission schedule or the current sequence numbers.

The messages from the tag 110 may also contain the time until the next transmission by the tag 110 and also the current time at the tag 110. These timing numbers may be used to maintain synchronization between the tag 110 and the security centre 112 in the event that some of the messages become lost in radio transmission (e.g., because the tag 110 and container is shielded inside a tunnel during transit or due to communications errors) or elsewhere in the network (e.g., due to congestion) or due to faults in the timing apparatus 220 in the tag 110 (e.g., due to a "slow" or "fast" clock in the tag). During communications travel mode, the tag 110 may monitor its radio and communications conditions and signal a "communications re-established" message when the tag 110 is again able to communicate, such as when emerging from a tunnel during its journey.

If during the monitoring of the conditions of the tag 110, the tag 110 detects an alarm condition, the tag 110 may attempt to establish communications with the security centre 112 to notify of the problem. This may be done using any of the various communications systems and network paths within the capability of the tag 110. These alarm messages may contain, in addition to the alarm status, an indication of the last used sequence number of the regular status messages sent by the tag 110 and the time until the next scheduled message. This may help establish the authenticity of the alarm message to the security centre 112. This will help to protect the system against attacks by adversaries that may, for example, report a counterfeit alarm from the tag 110 apparently located elsewhere, such as by playing back a previously generated alarm message, and hence dispatch security staff elsewhere while the tag 110 and container is pilfered.

The tag 110 may continue to attempt to establish communications with the security centre 112 until an acknowledgment of receipt of the alarm is received. This acknowledgement may contain an authentication of the security centre 112 that may be in the form of the sequence number of the alarm message received, the time of the alarm and its time of receipt, and also the sequence number of the last message received before the alarm condition was reported (e.g., the last status message sequence number). This authentication of the alarm message may be used to prevent the adversary from silencing the tag alarm messages by broadcasting a previously recorded alarm acknowledgement message.

When an alarm condition is detected by the tag 100, or when the tag 110 is directed to do so, the tag 110 enters alarm status. The alarm messages are repeatedly sent by the tag 110 until a suitable acknowledgement is received. In order to avoid the tag 110 depleting its battery through excessive transmissions in the alarm mode, the tag 110 may attempt to send unscheduled alarm messages for a predetermined time interval (e.g., five minutes). After the time interval elapses, the tag 110 may revert to the previous schedule for transmissions to the security centre 112 with the messages indicating the alarm condition and related details. This time interval may prevent blockage of the communications channels in the case where multiple containers are involved in an upset at the same time and all connected tags 110 attempt to signal their alarm conditions simultaneously. The tag 110 remains in the alarm status until the alarm conditions have cleared and the tag 110 has received a suitable command from the security centre 112 directing the tag 110 to return to the normal or travelling state.

In some alternatives, the tags 110 and containers containing hazardous materials, or materials of high value, may also report an alarm condition to an appropriate hazardous materials or police reporting centre. This signalling may be sent via a designated security centre, or may be directly sent if that routing is not available. The initiation of this alarm condition reporting may be directed by the security centre 112, or initiated independently by the tag 110, depending on the severity of the upset and the nature of the materials involved.

During the journey of the tag 110, in addition to communicating its status to the security centre 112 or the shippers' processing centre 114, the tag 110 may also log in its memory details of events of the journey for later download and analysis. This download may occur via the local connection 222 or wireless interface 206 while the tag 110 is at suitably equipped points in the journey or at the consignee's shipping dock when the tag 110 arrives at its destination. At points in the journey, the log might be inspected by, for example, customs inspectors or hazardous materials controllers to verify that the journey has been as planned and that no tampering with the cargo has occurred.

Delivery and Empty Monitoring Modes

When the tag 110 and its associated object arrives at its destination, the tag 110 may be switched into an unloading mode. This change of state may be initiated by the consignee either through direct interaction with the tag 110 using the local wired interface 222 or wireless interface 206 or by contacting the shippers' processing centre 114 to report the arrival. The processing centre 114 and the security centre 112 then send a message to the tag 110 to switch to the unloading mode. This command would be authenticated by the tag 110 and acknowledged before the tag 110 changes state. In one embodiment, in the unloading state the tag 110 no longer sends scheduled messages to the security centre 112 and does not send alarms as the cargo is unloaded. The tag 110 may continue to send informational messages to the security centre 112 or the shippers' processing centre 114 indicating the time of opening of the container and other events associated with the unloading.

After the cargo is unloaded, the consignee may again contact the shippers' processing centre 114 to indicate that the container is now empty and available for further journeys. In this case the processing centre 114 and the security centre 112 would send a message to the tag 110 to switch to the empty mode.

In some cases, the container may only be partly unloaded, or reloaded for a continued journey to another destination. In this case the consignee or shipper may contact the shippers' processing centre 114 or the tag 110 directly and request a change of state of the tag 110 to the travel mode. The tag 110 may then resume its schedule of transmissions to the security centre 112 and resume monitoring for alarm conditions. If the previously agreed schedule of communication with the security centre 112 does not provide sufficient times for the journey, the tag 110 and the security centre 112 may negotiate an additional set of times based on the previously agreed parameters (e.g., the secret key). Alternatively, the tag 110 and the security centre 112 may negotiate a new schedule of communications events based on a newly established parameter set (e.g., a new secret key).

In the empty mode, the tag 110 may still monitor the conditions of its associated object. Some pilfering or damage to the container may occur while it is idle, and the integrity of the container must be protected so that contraband is not loaded or security features disabled. To provide protection in this "empty" state the tag 110 and the security centre 112 may negotiate a random schedule of communications to continue to monitor the integrity of the container. This schedule may involve fewer messages than during the active travelling state. To conserve battery power during long idle intervals, the tag 110 may monitor and store events in its log and upload the log to the security centre 112 infrequently (e.g., once per day). During the idle state the container may be expected to remain stationary. In the event that the tag 110 does detect significant damage or movement, the tag 110 may immediately signal an alarm to the security centre 112 in the same manner as for an alarm condition detected during the travelling state.

Figure 3:
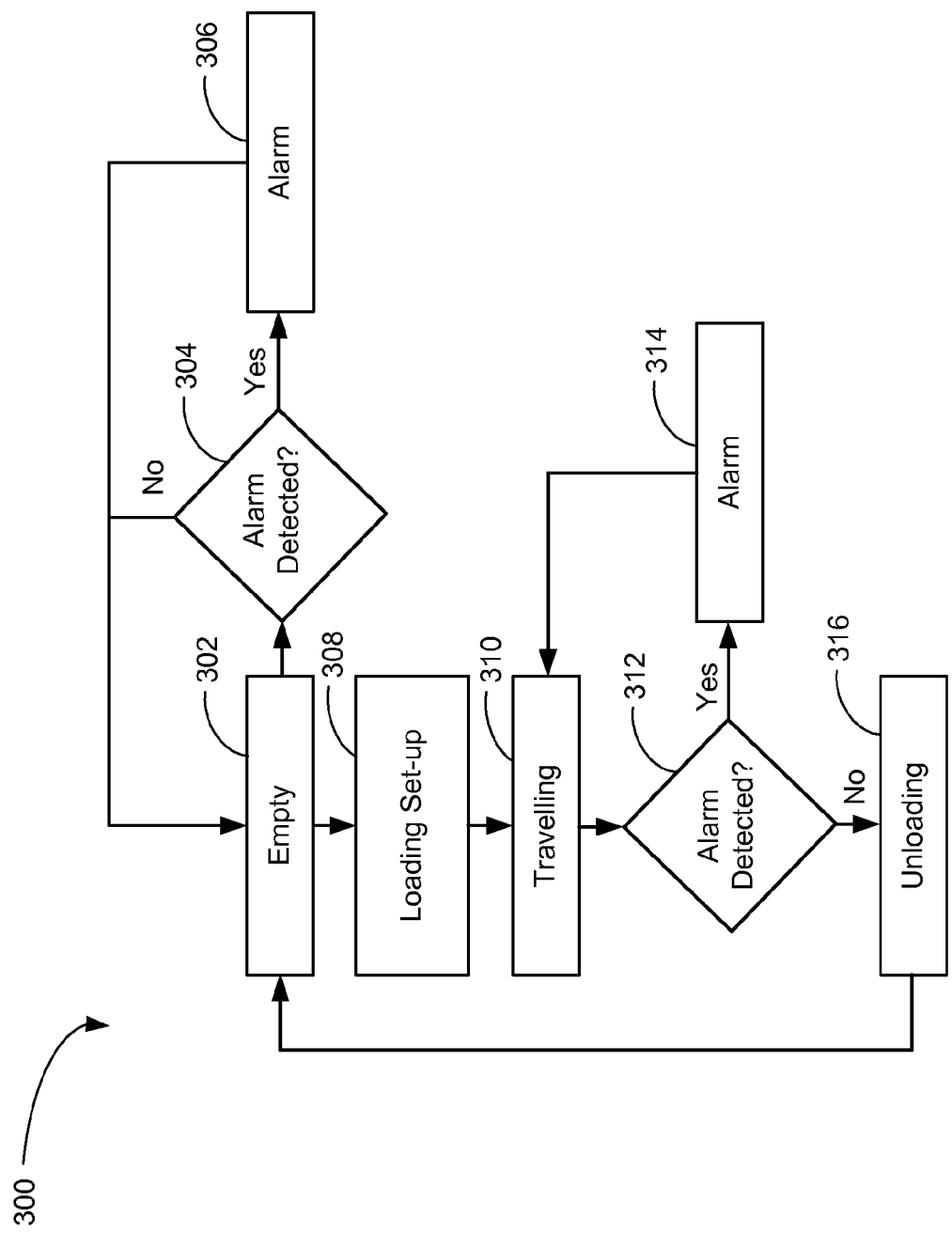
FIG. 3 shows in flow chart form the possible states of a tag during a typical journey in accordance with one embodiment.

Referring to FIG. 3, a flow chart is shown illustrating a process 300 showing the possible states of the tag 110 during a typical journey and the interrelationship of those states. At a first empty state 302, a container is empty and the associated tag 110 is therefore also in the empty state. While in the empty state, the tag 110 may also provide some monitoring functions and may detect an alarm condition at a step 304, to protect the integrity of the container, as described above. If an alarm is detected, at the step 304, an alarm is sounded at a step 306, and the respective reporting occurs, for example to the security centre 112. From the empty state 302, the tag may enter a loading set-up state, indicated by reference 308, while the tags' associated container is being loaded. Next, the tag 110 may progress to a travelling state, indicated by reference 310, while the tag 110 and its associated container or cargo are travelling. During the travelling state, the tag 110 is monitoring the container and reporting status messages, as described in detail above, and if an alarm is detected at a step 312, an alarm is signalled, for example to the security centre 112, at a step 314. Once arriving at the destination, the tag 110 and its associated container enter an unloading state, indicated by reference 316. Finally, the tag 110 arrives back at the empty state 302, once unloaded. Alternatively, and as described above, while the unloading state 316 is shown as being followed by the empty state 302, the unloading state 316 may be immediately followed by any of the loading set-up state 308 or the travelling state 310. The functioning of the tag 110 during the various states 302, 308, 310, and 316 has been already described in detail above in connection with FIGS. 1 and 2.

Figure 4:
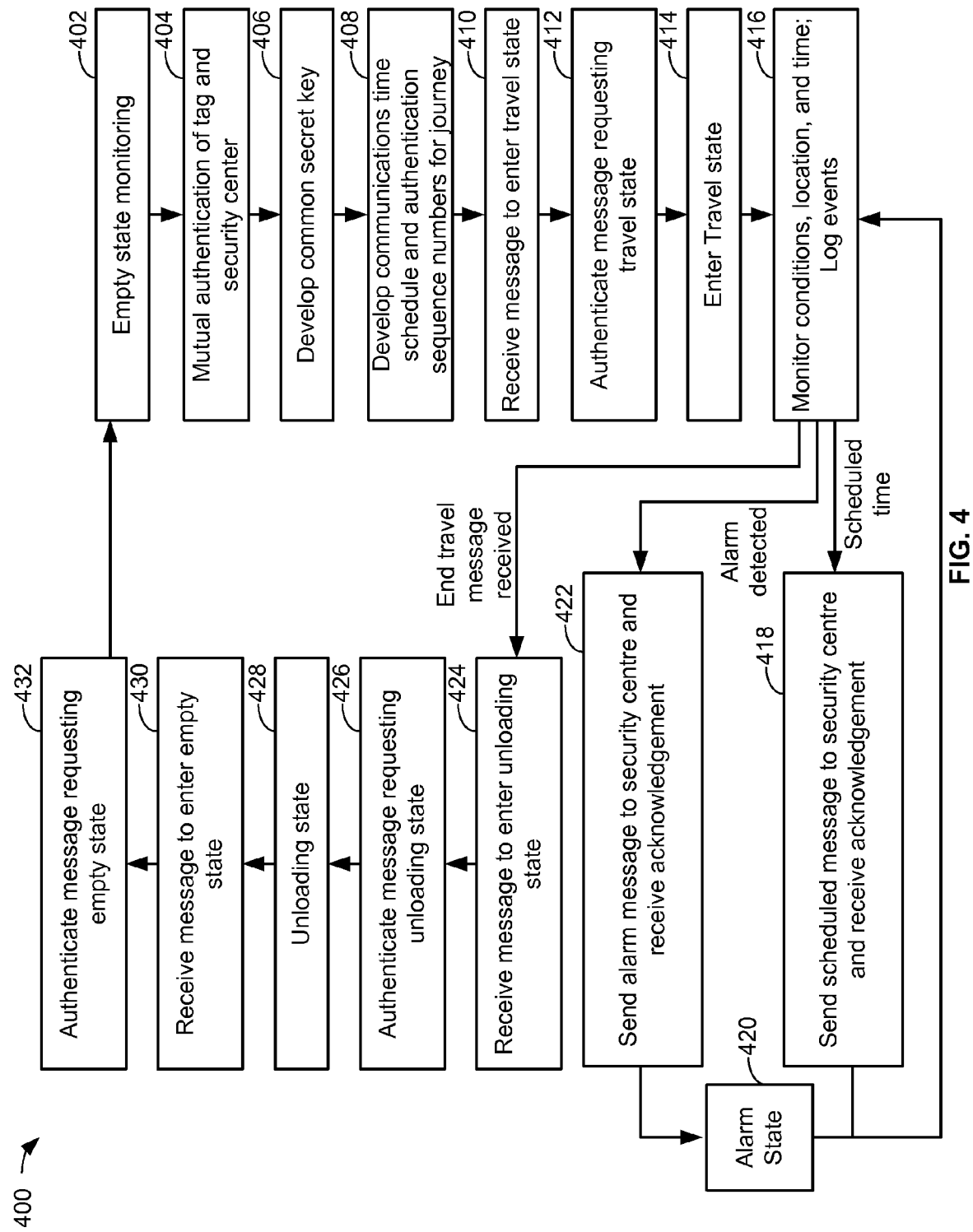
FIG. 4 shows in flow chart form a more detailed illustration of possible states and related communications sent or received by a mobile tag tracking system during a typical journey of a tag in accordance with another embodiment.

Referring to FIG. 4, a flow chart is shown illustrating a process 400 showing, in more detail than FIG. 3, the sequence of states and related communications facilitated by a mobile tag tracking system tag 110 during a typical journey. Specifically, FIG. 4 shows the messages received by the tag 110 that trigger the various states shown in FIG. 3 during a typical journey. Beginning at a state 402, the tag 110 is in an empty state monitoring mode. Before the tag 110 may enter the travel state, a number of exchanges occur between the tag 110 and, for example, the security center 112. At a step 404, a mutual authentication of the tag 110 and the security center 112 occurs, as described in detail above. Next, at a step 406, the tag 110 and the security center 112 develop a common secret key that forms the basis for secure communication to occur between the tag 110 and the security center 112 thereafter. Next, at a step 408, a communications time schedule and authentication sequence numbers are developed, as described above. Next, at a step 410, the tag 110 receives a message from the security centre 112 instructing the tag 110 to enter the travel state. The tag 110 authenticates the message from the security center 112 at a step 412 and enters the travel state, as indicated by reference 414. While in the travel state, the tag 110 monitors various conditions, for example the conditions of the associated container with which the tag 110 is travelling, the location of the container and tag 110, and the time, and the tag 110 logs this data in memory. While in the travel state and monitoring at the step 416, if a scheduled time arrives to send a status message to the security center 112, the tag 110 sends the scheduled message and receives an acknowledgement, indicated by step 418. While in the travel state and monitoring at the step 416, if the tag 110 detects an alarm, an alarm message is sent to the security centre 112 and an acknowledgement is received, indicated by step 422. At this point, an alarm is activated, indicated by step 420. While in the travel state and monitoring at the step 416, if the tag 110 receives an end travel message, for example from the security centre 112, indicated by step 424, the tag 110 authenticates the message at a step 426 and then enters the unloading state, indicated by step 428. While in the unloading state at the step 428, the tag 110 may further receive a message to enter the empty state, for example from the security centre 112, indicated by reference 430. The tag 110 authenticates this message at a step 432 and returns to the empty state monitoring at the step 402.

Note that in FIG. 4, the monitoring of the tag 110 conditions during the empty state 402 for possible alarm conditions is not explicitly detailed as this is similar to the process that occurs during the travelling state, denoted by references 414, 416, 418, 420, and 422. Again, the functioning of the tag 110 during the various states 402-432 has been described in detail above in connection with FIGS. 1 and 2. While FIGS. 3 and 4 illustrate one example of a typical sequence of steps in the processes 300 and 400, the steps shown in FIGS. 3 and 4 need not necessarily occur in the order shown and suitable modifications, additions, or omissions in the ordering of the steps shown may made.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A mobile tag tracking system for providing mobile security monitoring, the system including:
   a communications facility;
   a communications network coupled to the communications facility; and
   a mobile tag coupled to an item to be monitored, the mobile tag having a processor having a memory and for controlling operation of the mobile tag; a radio communications component coupled to the processor for communicating with the communications facility over the communications network for reporting status messages related to the item; a power supply coupled to the processor for providing power to the mobile tag; a security sequence generator coupled to the processor for generating binary sequences; a location tracking component coupled to the processor for determining the location of the mobile tag and providing a location signal to the processor; and a clock coupled to the processor;
   wherein the mobile tag communicates with the communications facility using randomly scheduled communications each including a status message, the randomly scheduled communications being based on a sequence of random times derived by the processor from a security sequence of binary numbers generated by the tag and the communications facility.

2. The mobile tag tracking system according to claim 1, wherein communications facility further queries the status of the mobile tag using randomly scheduled communications.

3. The mobile tag tracking system according to claim 1, wherein each status message includes a unique identifier for the communication.

4. The mobile tag tracking system according to claim 3, wherein the identifier comprises a sequence of numbers that is incremented for each randomly scheduled communication.

5. The mobile tag tracking system according to claim 3, wherein the identifier comprises random numbers jointly developed by the mobile tag and the communications facility, and not outside of the mobile tag tracking system.

6. The mobile tag tracking system according to claim 3, wherein the unique identifiers and the randomly scheduled communications are uniquely generated for each journey of the mobile tag.

7. The mobile tag tracking system according to claim 3, wherein the status message includes information for identification of the mobile tag and identification of the communications facility, the unique identifier which is unique to each scheduled communication, and at least one condition of the mobile tag and item.

8. The mobile tag tracking system according to claim 3, wherein the unique identifiers and randomly scheduled communications are determined based on at least one of: (a) a Diffie-Helman key exchange establishing a common secret number between the mobile tag and the communications facility; (b) a concatenation of random numbers generated by each of the mobile tag and the communications facility; (c) a concatenation of random numbers generated by each of the mobile tag and the communications facility serving as a seed for the security sequence generator; (d) a Diffie-Helman key exchange establishing a common secret number between the mobile tag and the communications facility, the common secret number used as an initialization vector and key for a crypto system; and (e) a concatenation of random numbers generated by each of the mobile tag and the communications facility, the concatenation used as an initialization vector and key for a crypto system.

9. The mobile tag tracking system according to claim 1, wherein the location tracking component includes a Global Positioning System (GPS) receiver and wherein the security sequence generator is selected from the group consisting of a pseudo random binary sequence (PRBS) generator, a digital encryption stand (DES) crypto sequence generator, and an advanced encryption standard (AES) crypto sequence generator.

10. A method for providing a mobile security monitoring system using a communications network to connect a mobile tag coupled to an item with a communications facility, the method including:
    monitoring conditions of the mobile tag and the item by the mobile tag; and
    sending randomly scheduled communications including status messages to the communications facility from the mobile tag;
    wherein scheduling of the randomly scheduled communications is based on a sequence of random times derived from a pseudo random sequence of binary numbers generated by a security sequence generator.

11. The method according to claim 10, wherein the status messages further each include information for identification of the mobile tag and information for identification of the communications facility and at least one condition of the mobile tag and the item.

12. The method according to claim 11, wherein the status messages further include a time of the next randomly scheduled communication.

13. The method according to claim 10, wherein the status message further includes an alarm message for the communications facility from the mobile tag when an alarm condition is detected by the mobile tag.

14. The method according to claim 10, wherein the security sequence generator is at least one of a pseudo random binary sequence (PRBS) generator, a digital encryption standard (DES) crypto sequence generator, and an advanced encryption standard (AES) crypto sequence generator.

15. The method according to claim 10 wherein the status messages include a unique identifier for each randomly scheduled communication.

* * * * *

UNITED STATES PATENT AND TRADEMARK OFFICE
CERTIFICATE OF CORRECTION

PATENT NO. : 8,217,785 B2
APPLICATION NO. : 12/259586
DATED : July 10, 2012
INVENTOR(S) : David Steer It is certified that error appears in the above-identified patent and that said Letters Patent is hereby corrected as shown below:

On the Title Page, Item (73) (Assignee), Delete "Research in Motion Limited" and insert -- Research In Motion Limited --, therefor.

Column 13, line 30, Claim 8, delete "Helman" and insert -- Hellman --, therefor.

Column 13, line 36, Claim 8, delete "Helman" and insert -- Hellman --, therefor.

Signed and Sealed this
Thirtieth Day of October, 2012

David J. Kappos
*Director of the United States Patent and Trademark Office*